(12) United States Patent
Kato

(10) Patent No.: US 8,240,860 B2
(45) Date of Patent: Aug. 14, 2012

(54) THREE DIMENSIONAL IMAGE DIAL FOR INSTRUMENT CLUSTER

(75) Inventor: Takahira Kato, Novi, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 334 days.

(21) Appl. No.: 12/544,559

(22) Filed: Aug. 20, 2009

(65) Prior Publication Data

US 2011/0044021 A1 Feb. 24, 2011

(51) Int. Cl.
*G01D 11/28* (2006.01)

(52) U.S. Cl. ............................. 362/23; 362/26; 362/27

(58) Field of Classification Search ............... 362/471, 362/489, 516, 543–545, 23–30; 116/286–288, 116/298, 310, 334, DIG. 5, DIG. 36; *G01D 13/04; G12B 11/00*
See application file for complete search history.

(56) References Cited

U.S. PATENT DOCUMENTS

| | | | | |
|---|---|---|---|---|
| 2,317,182 A | * | 4/1943 | Dickson et al. | 362/30 |
| 2,652,652 A | * | 9/1953 | Lasko | 362/27 |
| 3,125,251 A | * | 3/1964 | Poitras | 222/135 |
| 3,245,375 A | * | 4/1966 | Fiedler | 116/334 |
| 3,699,915 A | * | 10/1972 | Greene | 362/26 |
| 4,233,927 A | * | 11/1980 | Oikawa et al. | 116/287 |
| 5,291,851 A | * | 3/1994 | Muramatsu | 116/286 |
| 6,065,846 A | | 5/2000 | Kato et al. | |
| 6,318,872 B1 | | 11/2001 | Kato et al. | |
| 7,066,630 B1 | * | 6/2006 | Venkatram | 362/489 |
| 7,093,948 B2 | * | 8/2006 | Fong et al. | 362/30 |
| 7,275,497 B2 | | 10/2007 | Kato | |
| 7,357,095 B1 | * | 4/2008 | Fong et al. | 116/286 |
| 7,404,374 B2 | | 7/2008 | Kato | |
| 7,537,354 B2 | | 5/2009 | Kato | |
| 7,537,363 B2 | | 5/2009 | Kato | |
| 7,771,069 B2 | * | 8/2010 | Werman et al. | 362/29 |
| 2003/0067758 A1 | * | 4/2003 | Shipman | 362/26 |
| 2004/0125585 A1 | * | 7/2004 | Sung | 362/23 |
| 2006/0212162 A1 | | 9/2006 | Kato | |
| 2008/0151525 A1 | | 6/2008 | Kato | |
| 2008/0209748 A1 | | 9/2008 | Kato | |

* cited by examiner

*Primary Examiner* — Y My Quach Lee
(74) *Attorney, Agent, or Firm* — Harness, Dickey & Pierce, PLC

(57) ABSTRACT

An indicating instrument, such as for an instrument cluster, may employ a dial with numerous lighted indicia and numerous lighted graduations, to individually demark the indicia. The indicia and graduations may be viewable on a first side of the dial, while on a second side of the dial, a frustum of a rectangular pyramid may be located immediately behind, relative to a viewer, each graduation. A light emitting diode may provide light into and through the protruding frustum, and a reflector case mounted to the dial may direct light from the light emitting diode into the frustum. Light directed into the frustum may pass through the frustum, through the graduation, and out of the graduation to the first side of the dial. Instead of a frustum, a recessed portion with four sloping and converging sides into the dial may be utilized to produce an illuminated graduation with a three-dimensional appearance.

20 Claims, 7 Drawing Sheets

THREE DIMENSIONAL IMAGE DIAL FOR INSTRUMENT CLUSTER

FIELD

The present disclosure relates to an instrument of an instrument cluster, and more specifically, three-dimensional features of an instrument.

BACKGROUND

This section provides background information related to the present disclosure which is not necessarily prior art. Instrument clusters within vehicles may include a collection of instruments for displaying operational information such as vehicle speed, engine RPM, engine temperature, fuel level, alternator output and other information related to driving or vehicle component status. Vehicle instruments may include analog or digital readings for displaying information depending upon manufacturer and styling preferences. An analog instrument typically includes a face having indicia such as numbers, graduations to demark the indicia and a pointer for rotating to the graduations.

One design consideration for an instrument cluster and associated instruments is the ability of a vehicle operator to easily view and read the instruments in all driving environments. In particular, nighttime driving requires the instrument cluster to illuminate in some fashion such that the numbers and indicia are quickly and easily discernible. One method of making the instrument cluster more quickly easily discernible is to use three-dimensional instrument faces; however, such three dimensional instrument faces have not been without their share of problems. For instance, graduations and indicia of instruments may protrude above the instrument face thereby creating an instrument that may not be quickly readable because of the quantity of three dimensional parts. Still yet, pressed sheets traditionally used to form instrument faces may not be producible with sharp corners and sharp edges, and thus when illuminated, such faces do not provide a desirable lighted, three-dimensional appearance. What is needed then is a device that does not suffer from the above disadvantages.

SUMMARY

This section provides a general summary of the disclosure, and is not a comprehensive disclosure of its full scope or all of its features. An instrument, such as an indicating instrument as part of a vehicle instrument cluster, may employ a dial with numerous illuminated indicia (numerals indicating mph, km/h) and numerous lighted graduations corresponding to the indicia. The indicia and graduations may be on a first side of the dial with the graduations located outboard of the indicia. A protruding portion that protrudes beyond a rear surface of the dial may protrude from a second side of the dial, such as immediately behind (with reference to a typical driver's view) a graduation. The instrument may further employ a light emitting diode that provides light into and through the protruding portion and a reflector case mounted directly to the dial. The reflector case may further direct stray or scattered light, which first strikes the reflector case, into the protruding portion. Light directed into the protruding portion may pass through the protruding portion, through the graduation, and out of the graduation to the first side of the dial.

The protruding portion may further employ numerous pointed peaks and valleys on a side farthest from the second side of the dial. The protruding portion may be directly aligned with the graduation on the first side of the dial and geometrically, be a frustum of a rectangular pyramid; moreover, the frustum may have a flat side parallel to the second side of the dial. The geometric shape of the protruding portion is viewable through the clear or opaque graduation of the face of the dial to present a three-dimensional appearance to a viewer. A protruding portion may directly align and correspond with each instance of a graduation such that the number of graduations and the number of protruding portions are equal. The numerical indicia and the graduations may be recessed into the face of the dial. The dial may be a single molded piece with the indicia, graduations and protruding portion being part of such single molded piece. Alternatively, the dial may actually be two pieces formed of a sheet dial with the plurality of indicia, and a molded ring with the graduations and the protruding portion. The sheet dial and the molded ring are attachable to each other.

In another embodiment, an indicating instrument may employ numerous lighted indicia and numerous lighted graduations on a first side of the dial with the graduations located outboard of the indicia. A recessed portion may be integrally molded into a second side of the dial that is directly opposite the graduations so that the recessed portions directly align with the graduations. A light emitting diode may provide light into and through the recessed portion such that upon light passing through the recessed portion, the light passes out of the graduation to the first side of the dial to be viewed by a viewer. A reflector case may be mounted directly to the dial to direct light from the light emitting diode into the recessed portion.

A dial thickness at a location of a recessed portion may be less than a dial thickness at a location at an indicia, while a dial or ring portion with a protruding portion may be thicker than at a location with an indicia. A recessed portion may directly align and correspond with each instance of a graduation such that the number of graduations and the number of recessed portions are equal. The dial may be a single molded piece within which the indicia, graduations and recessed portion reside. Alternatively, the dial may be two pieces and further employ a sheet dial with the numerous indicia, and a molded ring with the numerous graduations and the recessed portion. The sheet dial and the molded ring may be attachable to each other. The recessed portion may terminate with a flat surface, which may be parallel to the second side of the dial.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
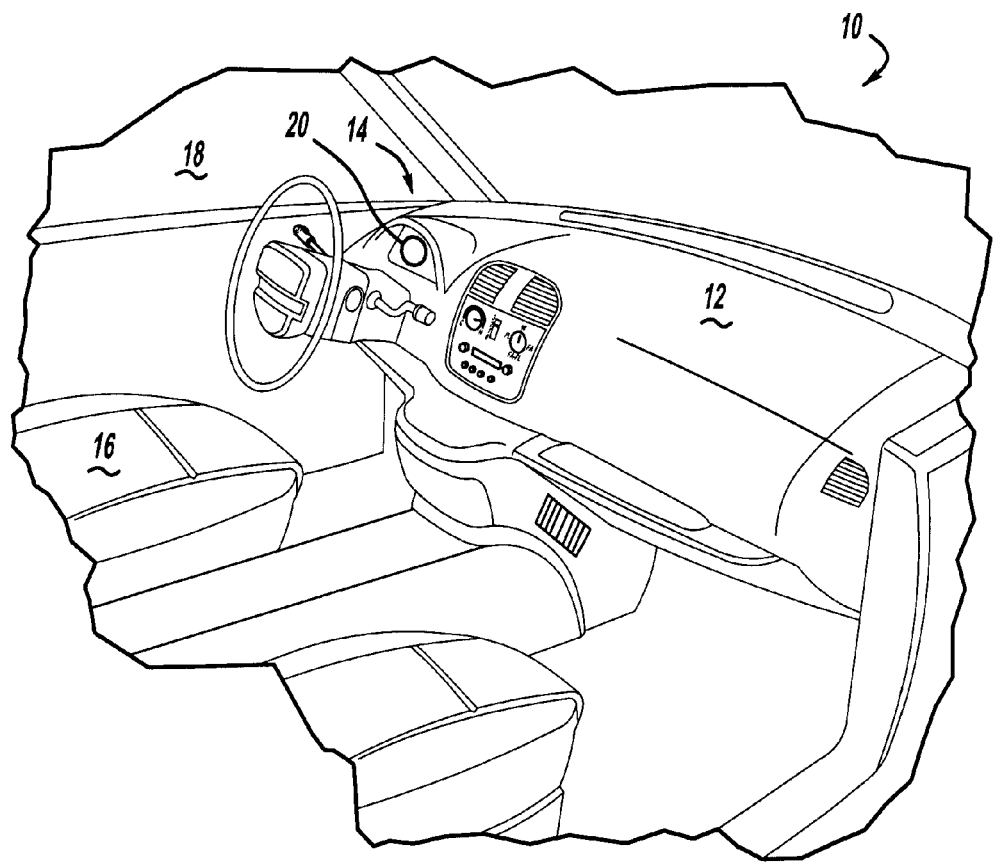
FIG. 1 is a perspective view of a vehicle interior depicting a location of an instrument in a dash.

Example embodiments will now be described more fully with reference to FIGS. 1-16 of the accompanying drawings. Turning first to FIG. 1, a vehicle 10 having a dash 12 may possess an instrument cluster 14, both of which may be situated in front of a driver's seat 16 in the interior cabin 18 of vehicle 10. As part of instrument cluster 14, an instrument 20, which may also be known as a gauge, meter, or dial, is depicted. It is appreciated that instrument 20 may be exemplified with another function such as, but not limited to, a tachometer, a fuel gauge, a temperature gauge, an oil pressure gauge, etc. For purposes of this description, instrument 20 will be exemplified by a speedometer.

Figure 2:
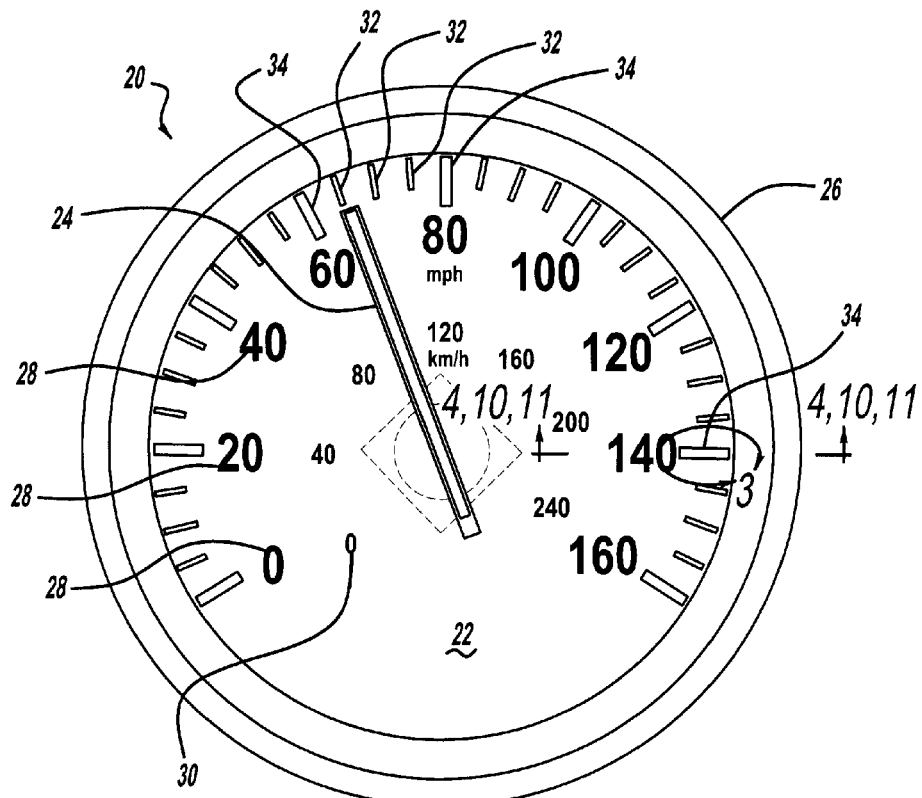
FIG. 2 is a front view of a face of an instrument that corresponds to embodiments of the present teachings.

Turning to FIG. 2, instrument 20 may include a face 22, a pointer 24, and a housing 26, which may define an outer perimeter of instrument 20. About an outer periphery of face 22, but within the confines of housing 26, a series of major indicia 28 may be located. Major indicia 28 may indicate miles per hour ("mph") if the adopted unit of measure in a country for vehicle speed is mph. Similarly, instrument 20 may also exhibit minor indicia 30 to indicate kilometers per hour ("km/h") if an adopted auxiliary unit of measure for vehicle speed is km/h.

As depicted in FIG. 2, major indicia 28 and minor indicia 30 may be demarked on face plate using graduations. For instance, small minor graduations 32 may be placed between relatively large major graduations 34. Major graduations 34 may be used to demark speeds on face 22 every ten or twenty miles per hour from zero to 160 miles per hour, for example. Similarly, in a country utilizing kilometers per hour, major graduations 34 may be used to demark speeds on face 22 every ten or twenty kilometers per hour from zero to 240 kilometers per hour, for example. Minor graduations 32 may be used to demark intermediate speeds not demarked by major graduations 34.

Figure 3:
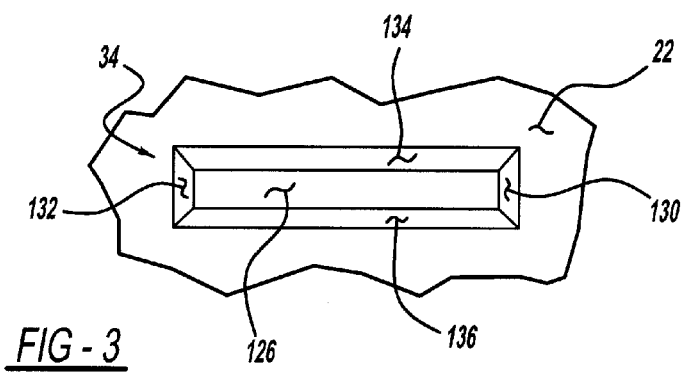
FIG. 3 is a front, three-dimensional view of a graduation of the face of FIG. 2.

FIG. 3 depicts a representative three-dimensional appearance of a major graduation 34, such as that paired with or corresponding to indicia indicating a speed of "140" on face 22. While major graduation 34 is being used as an example in FIG. 3, any minor graduation between a major graduation, such as minor graduations 32, could also be manufactured in accordance with the present teachings to provide a three-dimensional appearance to graduation portions 32, 34 of instrument 20 or graduations of any embodiment of the teachings.

Figures 4, 5, 6, 7:
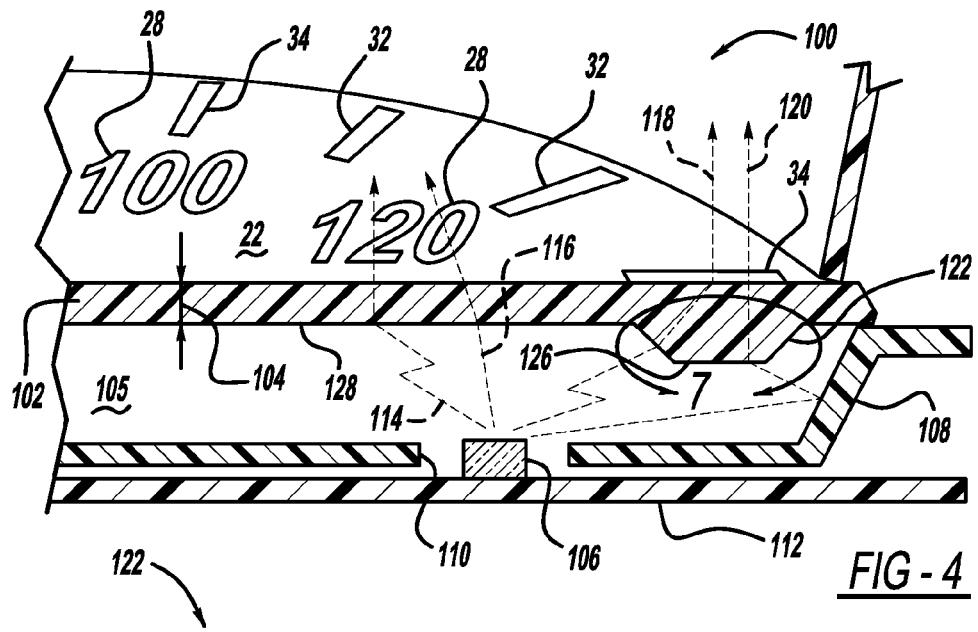
FIG. 4 is a cross-sectional view of a portion of the face of FIG. 2, depicting a protruding portion, in accordance with an embodiment of the present teachings.
FIG. 5 is a perspective view of the protruding portion of FIG. 4.
FIG. 6 is a top or front view of the protruding portion of FIG. 4.
FIG. 7 is a side view of an embodiment of a protruding portion.

Turning to FIG. 4, an embodiment of a molded dial 100 of an instrument exhibiting a three-dimensional feature will be explained. Molded dial 100 may have a base portion 102 and a face 22. Base portion 102 may be molded in a mold from a plastic such as, but not limited to, polycarbonate or acrylic. The material used for base portion 102 is capable of undergoing a hot molding process and completely passing light. Moreover, the material is capable of being printed in ink or being painted to complete face 22 in a color yet leave areas capable of passing light. In all embodiments of the teachings, face 22 may be printed in a dark color ink, such as black, to prevent the passage of light completely through the thickness 104 except at graduations 32, 34 and major indicia 28, which are both illuminated by a corresponding light source, such as a light emitting diode ("LED") 106. Graduations 32, 34 may be located outboard of corresponding indicia 28, relative to a center of instrument 20, such as where pointer 24 pivots. To direct light beams from LED 106 adjacent to base portion 102, a reflector case 108 may be directly mounted or attached to base portion 102, such as with a snap structure or a traditional screw fastener, in a way that forms a gap 105 between base portion 102 and reflector case 108 and that permits LED 106 to protrude into and/or through an aperture 110 in reflector case 108. As depicted in FIG. 4, LED 106 may be mounted to a printed circuit board ("PCB") 112. When LED 106 emits light, reflector case 108 contains light rays, such as light rays 114, 116, 118, 120 and reflects such light rays through the light-passing portions of base portion 102, such as indicia 28 and graduations 32, 34.

With continued reference to FIG. 4, before light rays 118, 120 pass through major graduation 34, which is demarked by indicia 28 indicating "120" mph, light rays 118, 120 must pass into and through protruding portion 122 of base portion 102. Protruding portion 122 protrudes rearward, away from rear surface 128 of base portion 102 and may directly align with graduation 34 such that the geometry of protruding portion affects what a viewer sees on a front side of face 22 when graduation 34 is viewed. Moreover, a separate protruding portion may protrude rearward, as depicted, for each and every graduation of instrument 20. That is, protruding portions are separate, individual protruding pieces and not a single continuous, 360 degree, protruding ring on rear surface 128. More specifically, protruding portion 122 of FIG. 4 may be a frustum of a rectangular pyramid that is molded into as an integral part of base portion 102. FIGS. 5 and 6 depict protruding portion 122 detached and free from the balance of base portion 102 for purpose of explanation. Accordingly, for a viewer of face 22 of molded dial 100 to see graduation 34 as depicted in FIG. 3, protruding portion 122 may be in the shape of a frustum of a rectangular pyramid, with the largest of its parallel rectangles formed into a base of protruding portion 122. That is, largest rectangular surface 124 of protruding portion is part of rear surface 128 and smallest rectangular surface 126 lies at a distance away from rear surface 128 of base portion 102, yet parallel to rear surface 128 of base portion 102. The balance of surfaces forming protruding portion 122 are skewed pairs. That is, surface 130 and 132 are at opposite ends of protruding portion 122 and are skew surfaces and surface 134 and surface 136 are at opposite ends of protruding portion 122 and are skew surfaces.

Figure 8:
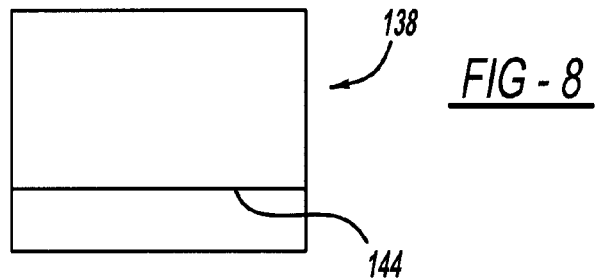
FIG. 8 is an end view of an embodiment of the protruding portion of FIG. 7.
Figure 9:
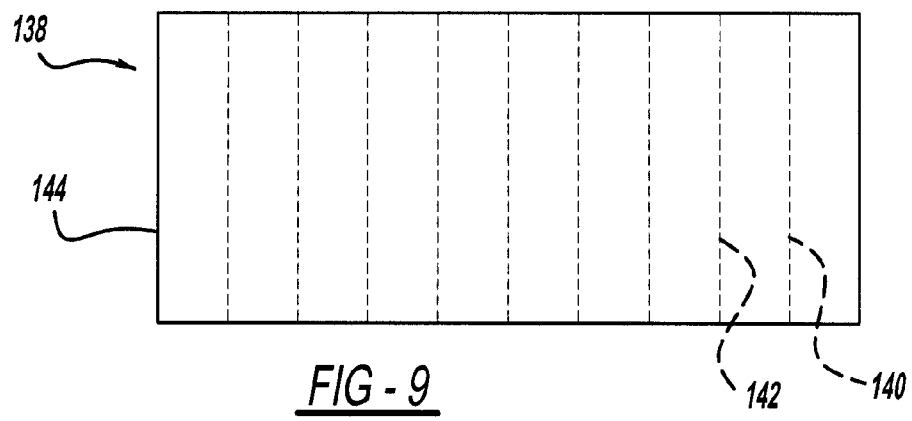
FIG. 9 is a top view of an embodiment of the protruding portion of FIG. 7.

Turning now to FIG. 7, an alternate embodiment of a protruding portion that protrudes from base portion 102 is depicted as protruding portion 138. Protruding portion 138 may be configured to have a series of peaks 140 farthest from base portion 102 and a series of valleys 142 closer to base portion 102. FIG. 8 depicts an end view of protruding portion 138 depicting edge 144 and FIG. 9 depicts a top view of protruding portion 138 such that peaks 140 protrude away from a viewer and accordingly, peaks 140 and valleys 142 are depicted as hidden lines. The embodiment of protruding portion 138 depicted in FIGS. 7-9 provide a viewer with a graduation 34 that has a texture or chiseled appearance whether protruding portion 138 is illuminated or not illuminated. Additionally, peaks 140 and valleys 142 provide protruding portion 138 with angles to better capture or intercept light from LED 106, for example, because light rays 118, 120 contact surfaces 146 of protruding portion 138 at an angle at or near 90 degrees than smallest rectangular surface 126 of protruding portion 122 of FIG. 4. With surfaces 146 between peaks 140 and valleys 142, light is more likely to be directed into protruding portion 138 and reach a viewer's eye when a viewer views face 22 as compared to protruding portion 122 and its rectangular surface 126, from which light from LED 106 may more easily be reflected. Thus, given the same LED arrangement, protruding portion 138 may also appear brighter to a viewer.

Figure 10:
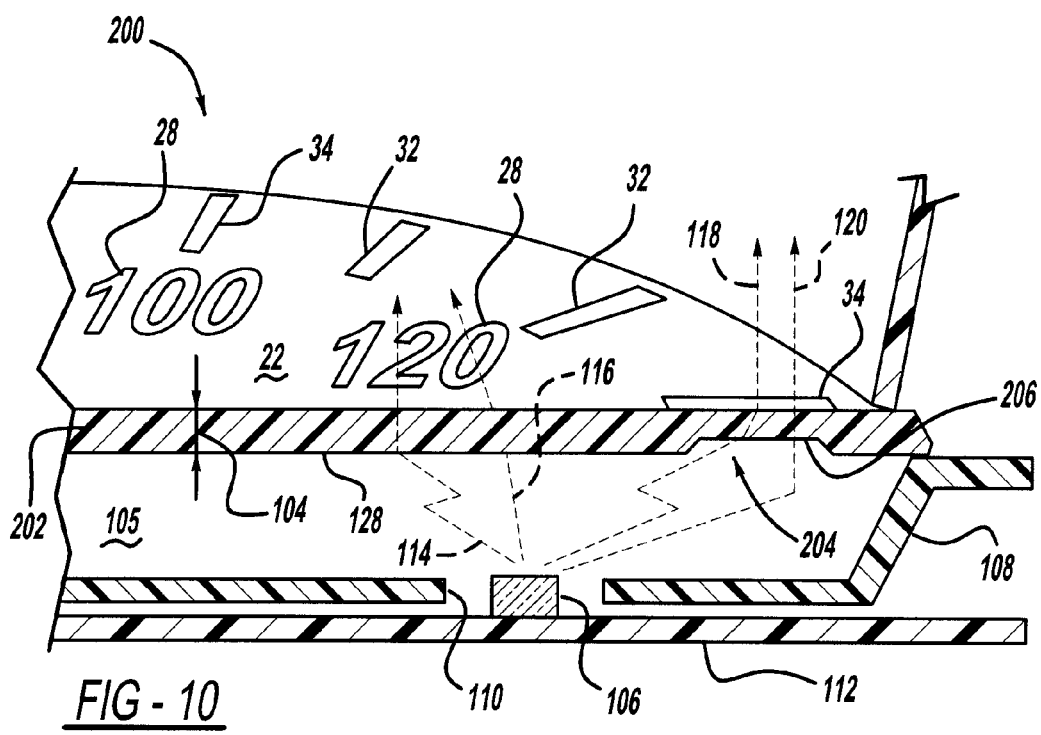
FIG. 10 is a cross-sectional view of a portion of the face of FIG. 2, in accordance with an embodiment of the present teachings.

Turning now to FIG. 10, another embodiment of a molded dial 200 is depicted. With the exception of base portion 202, the balance of the components depicted in FIG. 10 may be identical to those depicted in FIG. 4, thus, primarily only differences and advantages of base portion 202 will be discussed. On rear surface 128 of base portion 202 a recessed portion 204 serves to capture light from LED 106 and provide a view of graduation 34 to a viewer of face 22 such as that depicted in FIG. 3. More specifically, from a structural aspect, recession 204 in a top view, may appear as depicted in FIG. 6 and have sloped surfaces. However, instead of sloped surfaces protruding away from rear surface 128, four sloped surfaces may together converge at rectangular surface 206, which may be recessed into rear surface 128. An advantage of molded dial 200 with recession 204 is that less space and less material is required than if base portion 102 with protruding portion 122 (FIG. 4) is used. Stated differently, the overall thickness of base portion 202 may be limited to thickness 104, while the thickness of base portion 102 cannot be limited to thickness 104, but is increased by the distance that smallest rectangular surface 126 protrudes from rear surface 128, as depicted in FIG. 4.

Figure 11:
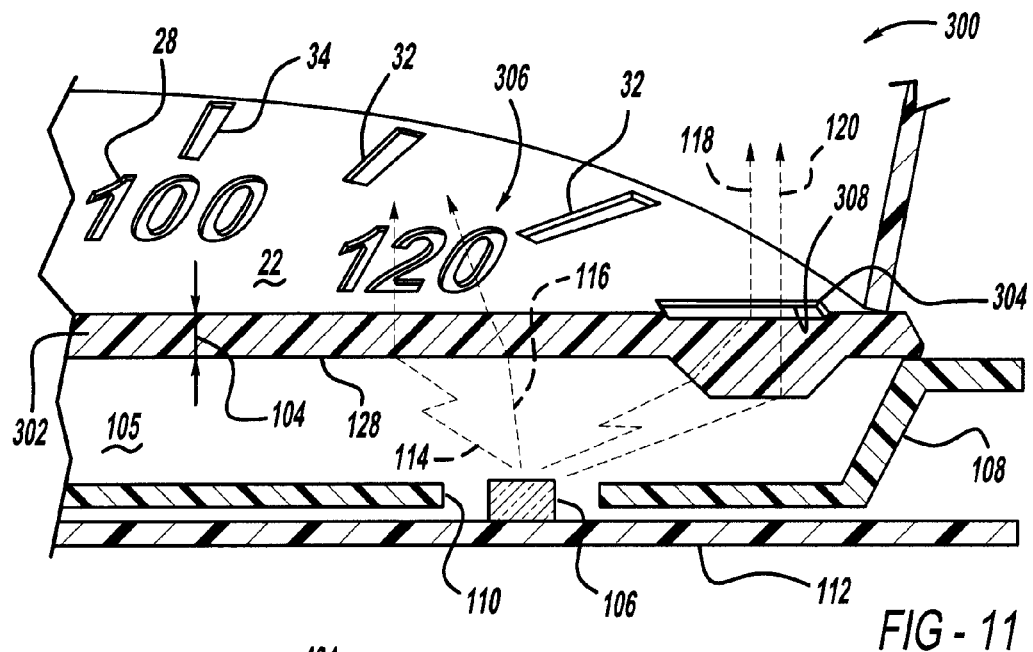
FIG. 11 is a cross-sectional view of a portion of the face of FIG. 2, in accordance with an embodiment of the present teachings.

Turning now to FIG. 11, a molded dial 300 is depicted in which graduation 304 and indicia 306 are recessed into face 22 of base portion 302. Graduation 304 and indicia 306 are used as examples regarding molded dial 300, and other graduations and indicia in face 22 may be molded or constructed in the same fashion. Continuing, indicia 306 and graduation 304, which demarks indicia 306, are recessed into face 22 to further provide a three-dimensional aspect to molded dial 300. To form recession 308 of graduation 304, two pairs of opposing walls, perpendicular to surface of face 22, may intersect at formed corners. The pairs of opposing walls may each form an angle of ninety degrees with surface of face 22. Alternatively, recession 308 may be formed by two pairs of opposing sloped surfaces that each form an angle, which is not ninety degrees, with viewed surface of face 22. Because base portion 302 may be a clear or opaque plastic material that transmits light, surfaces that form recession 308 may add depth and enhance the appearance of face 22, especially when graduation 304 is illuminated by LED 106. Although face 22 may be printed with ink, walls of recession 308 may not be printed, and thus remain clear or opaque to reflect and transmit light, thus further enhancing the three-dimensional aspect of molded dial 300 when face 22 is viewed by a viewer. When graduation 304 is viewed by a viewer, the three dimensional image depicted in FIG. 3 may be seen.

Figure 12:
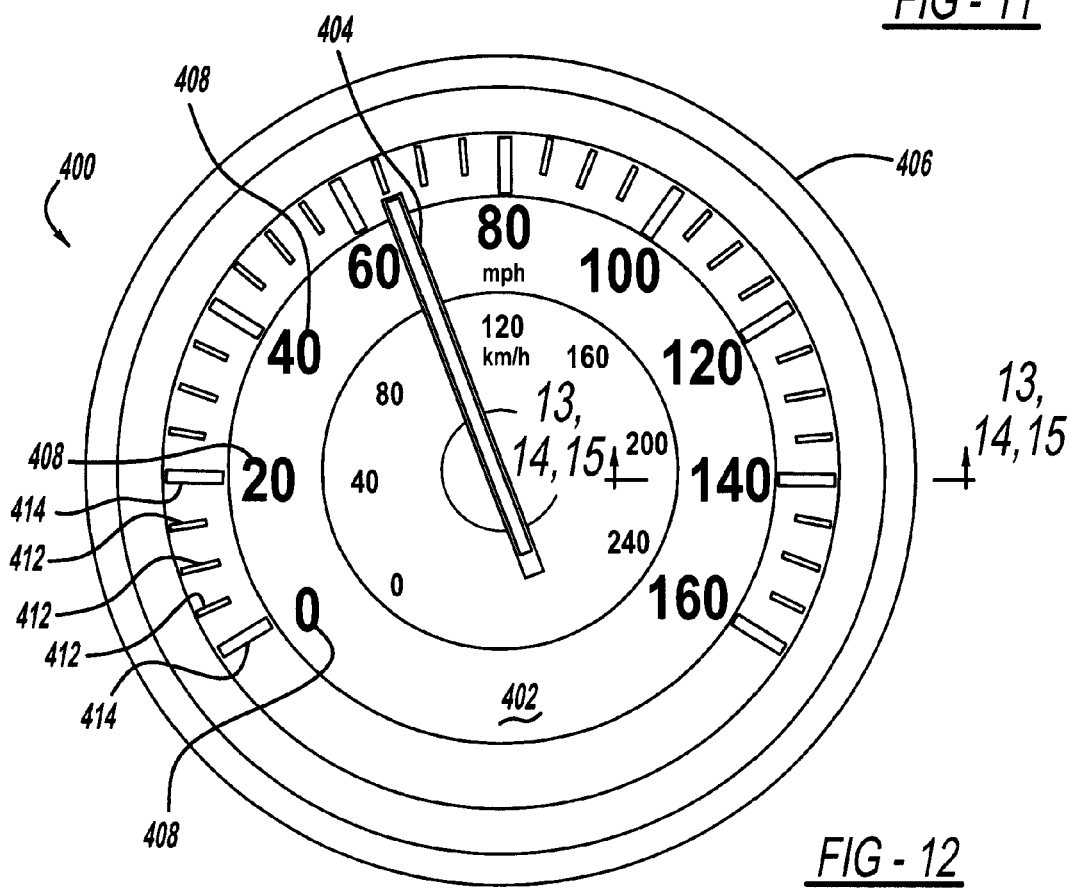
FIG. 12 is a front view of a face of an instrument in accordance with embodiments of the present teachings.

Turning to FIG. 12, another embodiment of the teachings will be presented. An instrument 400 may include a face 402, a pointer 404, and a housing 406, which may be an outer perimeter of face 402. About an outer periphery of face 402, but within the confines of housing 406, a series of major indicia 408 may be located to indicate major steps in speed at a chosen speed increment. Thus, as depicted in FIG. 12, major steps of speed may be every ten miles per hour, such as 0, 20, 40, 60, etc. if the adopted unit of measure for vehicle speed is mph. Similarly, instrument 400 may also indicate speeds between major indicia 408 and indicate kilometers per hour (km/h) if an adopted auxiliary unit of measure for vehicle speed is km/h.

As depicted in FIG. 12, major indicia 408 may be demarked on face 402 using graduations. For instance, minor graduations 412 may be placed between major graduations 414, which may be relatively larger in size than minor graduations 412. Major graduations 414 may be used to demark speeds on face 402 every twenty miles per hour from zero to 160 miles per hour, for example. Similarly, in a country utilizing kilometers per hour, major graduations 414 may be used to demark speeds on face 402 every twenty kilometers per hour from zero to 240 kilometers per hour, for example. Minor graduations 412 may be used to demark speeds not demarked by major graduations 414.

Figure 13:
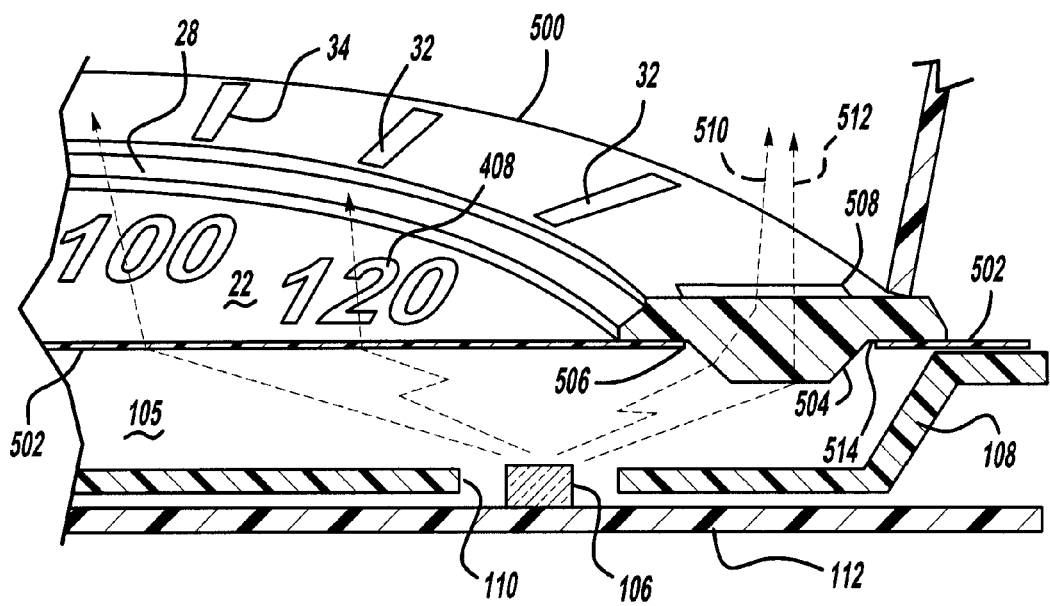
FIG. 13 is a cross-sectional view of a portion of the face of FIG. 12, in accordance with an embodiment of the present teachings.

Turning to FIG. 13, another embodiment of the present teachings will be presented. More specifically, FIG. 13 depicts a perspective and cross-sectional view of instrument 400 of FIG. 12 in which a molded ring 500 is coupled to a sheet dial 502. Thus, two pieces may be combined to form a dial, such as sheet dial 502 with numerous numerical indicia and molded ring 500 with numerous graduations to demark such indicia. Sheet dial 502 and molded ring 500 are attachable.

Sheet dial 502 may be coupled to molded ring 500 with traditional fasteners, an adhesive such as glue, or a snap fitting to facilitate quick juncture of molded ring 500 and sheet dial 502. Face 22 of sheet dial 502 may be printed with an ink layer, such as a black ink layer, except where light is to pass through sheet dial 502, such as where indicia, such as major indicia 408 reside. Continuing, molded ring 500 may be a separately molded plastic piece from the balance of the parts of instrument 400. An advantage of molded ring 500 being a separately molded piece is that different sheet dials 502 may be interchanged with molded ring 500, such as during manufacturing, depending upon the required scale (mph, km/h, etc.) of sheet dial 502 in the country of use.

FIG. 13 depicts a molded ring 500 having a protruding portion 504 that protrudes rearward and away from molded ring 500. More specifically, protruding portion 504 protrudes through a hole or aperture 506 of sheet dial 502 directly behind graduation 508. Before light rays 510, 512 pass through graduation 508, which is demarked by indicia 408 indicating "120," light rays 510, 512 must pass through protruding portion 504. Protruding portion 504 protrudes rearward away from rear surface 514 of molded ring 500. Protruding portion 504 may be a frustum of a rectangular pyramid that is molded into and is part of molded ring 500.

Protruding portion 504 of FIG. 13 is similar to protruding portion 122 of FIG. 4, for which a more detailed description is provided above. When a viewer of face 22 of molded dial 502 and molded ring 500 sees graduation 508, a three-dimensional graduation view, as depicted in FIG. 3, may be seen. A three-dimensional view is possible because protruding portion 504 is in the shape of a frustum of a rectangular pyramid, with the largest of its parallel rectangles as a base of protruding portion 504. A more detailed description of a frustum of a rectangular pyramid, similar to that of protruding portion 504, is explained in conjunction with FIGS. 4, 5 and 6.

Figure 14:
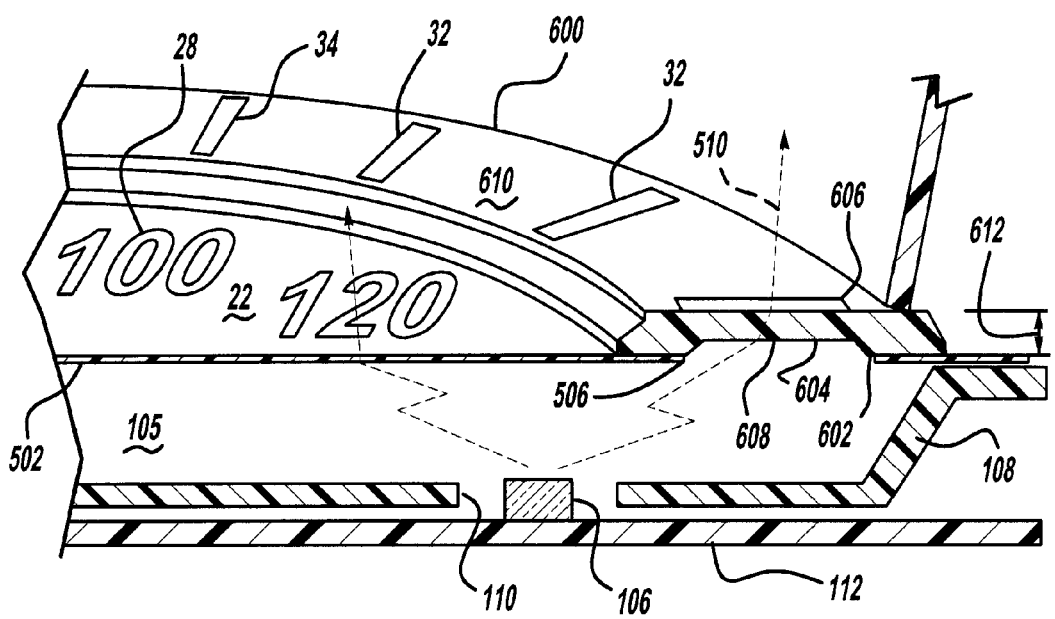
FIG. 14 is a cross-sectional view of a portion of the face of FIG. 12, in accordance with an embodiment of the present teachings.

Turning now to FIG. 14, another embodiment of a molded ring 600 is depicted. Molded ring 600 may be a separate molded plastic piece from sheet dial 502. On rear surface 602 of molded ring 600 a recessed portion 604 serves to capture light from LED 106 and provide an illuminated view of graduation 606 to a viewer of face 22. More specifically, to a viewer from a front side looking through graduation 606, recessed portion 604 may appear as depicted in FIG. 3, with sloped surfaces 130, 132, 134, 136 (FIG. 6) that protrude into molded ring 600. That is, rectangular portion 608 of recessed portion 604 is molded into molded ring 600 a distance from rear surface 602. Rectangular portion 608 is closer to front surface 610 of molded ring 600 than rear surface 602 is.

An advantage of molded dial 600 with recessed portion 604 is that a lighter part with less material may occupy less space than if molded dial 600 is manufactured with a protruding portion 504, as explained in at least FIG. 13. Stated differently, the overall thickness of molded ring 600 may be limited to thickness 612, while the thickness of molded ring 500 can not be limited to thickness 612, but is increased by the distance that protruding portion 504 protrudes from rear surface 514, as depicted in FIG. 13. With the exception of molded ring 600, the balance of the components depicted in FIG. 14 may be identical to those depicted in FIG. 13.

Figure 15:
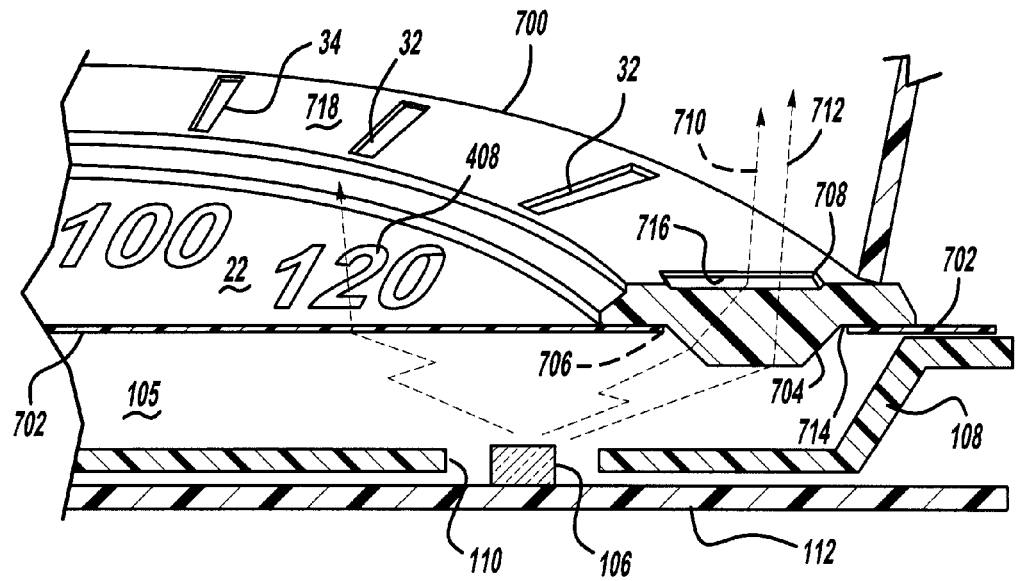
FIG. 15 is a cross-sectional view of a portion of the face of FIG. 12, in accordance with an embodiment of the present teachings.

Turning to FIG. 15, another embodiment of instrument 400 is depicted in which a molded ring 700 is fastened to a sheet dial 702. Sheet dial 702 may be coupled to molded ring 700 with traditional fasteners, an adhesive such as glue, or a snap fitting to facilitate quick juncture of molded ring 700 and sheet dial 702. Face 22 of sheet dial 702 may be printed with an ink layer, such as a black ink layer, except where light is to pass through sheet dial 702, such as where major indicia 408 resides. Continuing, molded ring 700 may be a separately molded clear or opaque plastic piece from the balance of the parts depicted in FIG. 15. An advantage of molded ring 700 being a separately molded piece is that different sheet dials 702 may be interchanged with molded ring 700 depending upon the required scale (mph, km/h, etc.) of sheet dial 702 depending upon the country of use.

FIG. 15 depicts a molded ring 700 having a protruding portion 704 that protrudes rearward and away from molded ring 700. More specifically, protruding portion 704 protrudes through a hole or aperture 706 of sheet dial 702 directly behind graduation 708. Before light rays 710, 712 pass through graduation 708, which demarks indicia 408 indicating "120," light rays 710, 712 must pass into and through protruding portion 704. Protruding portion 704 protrudes rearward and away from rear surface 714 of molded ring 700. Protruding portion 704 may be a frustum of a rectangular pyramid that is integrally molded into and is part of molded ring 700. Protruding portion 704 of FIG. 15 is similar to protruding portion 504 of FIG. 13, and protruding portion 122 of FIG. 4, for which descriptions are provided above. When a viewer of face 22 of molded dial 702 and molded ring 700 sees illuminated graduation 708, a three-dimensional graduation view as depicted in FIG. 3, may be seen. A three-dimensional view is possible because protruding portion 704 is in the shape of a frustum of a rectangular pyramid, with the largest of its parallel rectangles integrally molded as a base of protruding portion 704. That is, base portion, from which protruding portion 704 protrudes, is an integral part of rear surface 714 of molded ring 700. A more detailed description of a frustum of a rectangular pyramid, similar to that of protruding portion 704, is explained above in conjunction with FIGS. 4, 5 and 6.

Another aspect of molded ring 700 of FIG. 15 is graduation 708 may be recessed into molded ring 700. Graduation 708 is being used as an example of a graduation that may be recessed into molded ring 700, and it is to be understood that other graduations may be recessed into molded ring 700. Continuing, graduation 708 may be recessed into molded ring 700 to further provide a three-dimensional aspect to molded ring 700. To form recession 716 of graduation 708, two pairs of opposing walls, perpendicular to surface of face 22, may intersect to form sharp corners. The pairs of opposing walls may each form an angle of ninety degrees with surface of face 22. Alternatively, recession 716 of graduation 708 may be formed by two pairs of opposing sloped surfaces. Each sloped surface may form an angle, which is not ninety degrees, with face 22. Because molded ring 700 may be a clear or opaque plastic material that transmits light, surfaces (either sloped or perpendicular to face 22) that form recession 716 may add depth and enhance the appearance of graduation 708 and face 22, especially when graduation 708 is illuminated by LED 106. Although face 22 and surface 718 of molded ring 700 may be printed with ink, surfaces of recession 716 may not be printed, and thus be left clear or opaque to reflect and transmit light to a viewer's eyes, thus further enhancing the three-dimensional aspect of molded dial 700 when viewed by a viewer.

Figure 16:
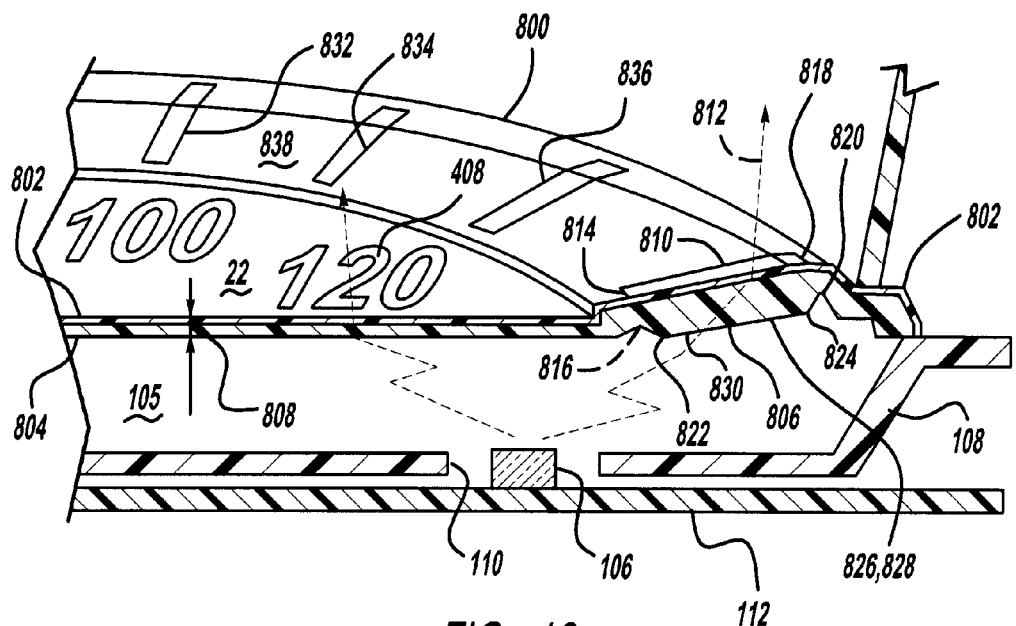
FIG. 16 is a cross-sectional view of a portion of a face of an instrument in accordance with an embodiment of the present teachings.

Turning now to FIG. 16, another embodiment of the teachings will be presented. FIG. 16 depicts an insert molded sheet dial 800 which may be a combination of a film or sheet 802 molded with and to a ring 804. Similar to previous embodiments, a protruding portion 806 protrudes rearward and away from face 22 of insert molded sheet dial 800 making protruding portion 806 thicker than other areas of insert molded sheet dial 800, such as a thickness 808 in face 22 region.

Continuing, insert molded sheet dial 800 possesses an advantage in that sheet 802 is heat bonded and/or pressed onto molded ring 804 during molding to create a single piece thereby eliminating fasteners or adhesives that may otherwise be necessary in joining a sheet with face 22 to molded ring 804. Protruding portion 806 may be located immediately behind or under graduation 810 to provide a three-dimensional appearance when a viewer views a front side of illuminated graduation 810, which may be illuminated by LED 106. Thus, when a viewer views graduation 810, a first graduation end 814 may align with first valley 816 of protruding portion 806 while a second graduation end 818 may align with second valley 820 of protruding portion 806. A first end edge 822, a second end edge 824, and first and second long side edges 826, 828 may bound small rectangular surface 830 of a frustum of a rectangular pyramid that creates three-dimensional appearance of graduation 810 when viewed from front side. An example of the three dimensional appearance of graduation 820 may be viewed in FIG. 3. While the description above in connection with FIG. 16 focused around graduation 810 and associated protruding portion 806, the description may be applied to any of graduations 832, 834, 836 viewable on surface 838.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An instrument comprising:
   a dial with a plurality of indicia and a plurality of graduations on a first side of the dial, the graduations being outboard of the indicia;
   a plurality of protruding portions that protrude through the dial and from a second side of the dial each of the plurality of protruding portions being aligned with a respective one of the plurality of graduations;
   a light emitting diode that provides light into and through each of the protruding portions;
   a reflector case mounted to the dial to direct light from the light emitting diode into each of the protruding portions, a sheet dial including the plurality of indicia; and a molded ring on the first side of the dial and including the plurality of graduations and the protruding portions, wherein the sheet dial and the molded ring are attachable; and
   light directed into each of the protruding portions passes through each of the protruding portions, through each of the graduations, and out of each of the graduations to the first side of the dial.

2. The instrument of claim 1, wherein each of the protruding portions further comprises a plurality of pointed peaks and valleys on a side farthest from the second side of the dial.

3. The instrument of claim 1, wherein each of the protruding portions is a frustum of a rectangular pyramid.

4. The instrument of claim 3, wherein each of the indicia is recessed into the dial.

5. The instrument of claim 4, wherein the dial is a single molded piece possessing the indicia.

6. The instrument of claim 1, wherein each of the protruding portions is a frustum of a rectangular pyramid with a flat side parallel to the second side of the dial.

7. The instrument of claim 1, wherein a size and a shape of each of the protruding portions corresponds to a size and a shape of the respective one of the plurality of graduations.

8. The instrument of claim 1, wherein:
   the plurality of protruding portions are a plurality of solid protruding portions; and
   the light emitting diode is spaced from the plurality of protruding in a direction away from the second side of the dial.

9. The instrument of claim 1, wherein:
   the plurality of protruding portions are a plurality of solid protruding portions; and
   the light provided by the light emitting diode travels through a solid portion of each of the plurality of solid protruding portions.

10. The instrument of claim 1, wherein the light emitting diode provides light into and through at least two of the protruding portions.

11. An instrument comprising:
    a dial with a plurality of indicia and a plurality of graduations on a first side of the dial, the graduations being outboard of the indicia;
    a plurality of recessed portions that are integrally molded into a molded ring and are opposite the indicia and graduations, each of the plurality of recessed portions being aligned with a respective one of the plurality of graduations;
    a light emitting diode that provides light into and through the recessed portion;
    a reflector case mounted to the dial to direct light from the light emitting diode into the recessed portion, a sheet dial including the plurality of indicia, the molded ring on the first side of the dial and including the plurality of graduations and the plurality of the recessed portions, wherein the sheet dial and the molded ring are attachable; and
    light provided to the recessed portion passes through the recessed portion and out of each of the graduations to the first side of the dial.

12. The instrument of claim 11, wherein a dial thickness at a location of each of the indica a ring thickness of the molded ring at a location of each of the recessed portions.

13. The instrument of claim 12, wherein the dial is a single molded piece within which the indicia reside.

14. The instrument of claim 11, wherein each of the recessed portions has a flat surface that is parallel to the second side of the dial.

15. The instrument of claim 11, wherein a size and a shape of each of the recessed portions corresponds to a size and a shape of the respective one of the plurality of graduations.

16. An instrument with a single piece dial comprising:
    a face portion with a plurality of indicia on a first side of the dial;
    a graduation ring on the first side of the dial, including a plurality of graduations and including a plurality of protruding portions being outboard of the indicia;
    the plurality of protruding portions protrude through the dial and from a second side of the dial, each of the plurality of protruding portions directly aligned with a respective one of the plurality of graduations;
    a light emitting diode that provides light into and through each of the protruding portions;
    a reflector case mounted to the dial to direct light from the light emitting diode into each of the protruding portions the dial comprising a sheet dial including the plurality of indicia; and the graduation ring comprising a molded ring on the first side of the dial and including the plurality of graduations and the protruding portions,
    wherein light directed into each of the protruding portions passes through each of the protruding portions, through the respective one of the plurality of graduations, and out of the respective one of the plurality of graduations to the first side of the dial.

17. The instrument of claim 16, wherein the graduation ring is at an angle relative to the face portion that is not ninety degrees.

18. The instrument of claim 16, wherein each of the protruding portions is a frustum of a rectangular pyramid.

19. The instrument of claim 18, wherein the indicia is recessed into the dial.

20. The instrument of claim 16, wherein a size and a shape of each of the protruding portions corresponds to a size and a shape of the respective one of the plurality of graduations.

* * * * *

UNITED STATES PATENT AND TRADEMARK OFFICE
CERTIFICATE OF CORRECTION

PATENT NO. : 8,240,860 B2
APPLICATION NO. : 12/544559
DATED : August 14, 2012
INVENTOR(S) : Takahira Kato It is certified that error appears in the above-identified patent and that said Letters Patent is hereby corrected as shown below:

Col. 10, line 20, claim 12, after "indicia" insert --is less than--

Signed and Sealed this
Fifth Day of February, 2013

Teresa Stanek Rea
*Acting Director of the United States Patent and Trademark Office*